United States Patent [19]

Dupont

[11] Patent Number: 5,049,623

[45] Date of Patent: Sep. 17, 1991

[54] ETHYLENICALLY UNSATURATED CARBAMATES AND COATING COMPOSITIONS

[75] Inventor: William A. Dupont, Wilbraham, Mass.

[73] Assignee: Monsanto Company, St. Louis, Mo.

[21] Appl. No.: 389,140

[22] Filed: Aug. 3, 1989

[51] Int. Cl.$^5$ .................................... C08F 283/04
[52] U.S. Cl. .................... 525/293; 525/454; 525/455; 522/90; 522/96; 428/424.2
[58] Field of Search .............. 525/293, 454, 455; 522/90, 96; 428/424.2

[56] References Cited

U.S. PATENT DOCUMENTS

| | | | |
|---|---|---|---|
| 3,749,592 | 7/1973 | Gaske et al. | 117/62 |
| 3,782,950 | 1/1974 | Rawz et al. | 96/85 |
| 3,871,908 | 3/1975 | Spoor et al. | 525/455 |
| 3,925,320 | 12/1975 | Morgan | 260/77.5 |
| 4,320,221 | 3/1982 | Hoffmann | 528/75 |
| 4,383,091 | 5/1983 | Burton | 525/454 |
| 4,565,857 | 1/1986 | Grant | 527/301 |
| 4,590,101 | 5/1986 | Knapczyk | 525/298 |
| 4,609,706 | 9/1986 | Bode et al. | 527/7.4 |
| 4,654,233 | 3/1987 | Grant et al. | 427/379 |
| 4,839,230 | 6/1989 | Cook | 428/423.1 |

OTHER PUBLICATIONS

Derwent Abstract 491602 of French application 2168623.

Primary Examiner—Melvyn I. Marquis
Assistant Examiner—W. R. H. Clark
Attorney, Agent, or Firm—R. Bruce Blance; William J. Farrington; Richard H. Shear

[57] ABSTRACT

Ethylenically unsaturated carbamates are prepared by reaction of unsaturated isocyanates with the hydroxy groups of styrene allyl alcohol copolymers. The ethylenically unsaturated carbamates either alone or formulated with unsaturated co-reactants such as (meth)acryloyl monomers and oligomers, maleates and fumarates provide radiation curable coating compositions.

22 Claims, No Drawings

ETHYLENICALLY UNSATURATED CARBAMATES AND COATING COMPOSITIONS

This invention relates to ethylenically unsaturated oligomers and their use in coatings and in particular it relates to ethylenically unsaturated carbamates of styrene allyl alcohol copolymers and their use in radiation-curable coating compositions.

Conventional lacquers for wood furniture have utilized nitrocelluloses and cellulose esters as the resin component. These lacquers provide high gloss coats but are generally deficient in solvent resistance and scratch resistance. These deficiencies have been addressed by modifying the nitrocelluloses and cellulose esters with ethylenic unsaturation to allow the coatings to be applied to wood surfaces to form thermoplastic films which can be repaired, rubbed or buffed in conventional fashion to provide the quality finish required for saleability. Then by irradiation with ultraviolet light or electron beam, the coatings are converted to the solvent resistant, physically tough form which is preferred for enhanced durability.

Such unsaturated nitrocelluloses and cellulose esters have been formed by reaction with unsaturated isocyanates. However, they have been found deficient in many aspects. In some instances, a high level of unreacted isocyanate has posed a toxic hazard in the spray application of the lacquer. The resins are applied as low solids solutions to overcome their viscous nature and hence generate high levels of volatile organic compounds when the lacquers are applied to substrates. The resins are incompatible with many of the co-reactants which are used to enhance the degree of radiation cure and thus the choice of co-reactant is limited. They provide coatings which are often deficient in sandability and when the coatings are cured by irradiation, they are deficient in solvent resistance, stain resistance, hydrolysis resistance or impact resistance. They are limited in use to coating of wood surfaces and are generally undesirable for plastic substrates since they impair the impact resistance of such substrates.

The present invention provides ethylenically unsaturated carbamates of styrene allyl alcohol copolymers which are prepared by the reaction of the copolymers with unsaturated isocyanates selected from the group consisting of vinyl isocyanates, isocyanatoalkyl acrylates, isocyanatoalkyl methacrylates, and aralkyl isocyanates.

Other aspects of the invention are directed to coating compositions comprising the ethylenically unsaturated carbamates of styrene allyl alcohol copolymers, substrates coated with the coating compositions and substrates coated with the radiation cured coatings The coating compositions may further comprise essentially non-volatile $\alpha,\beta$-ethylenically unsaturated co-reactants to enhance the radiation curability.

The present invention further provides a process for the preparation of the ethylenically unsaturated carbamates of styrene allyl alcohol copolymers and a method of providing a substrate with a protective coating comprising applying to the substrate a coating composition comprising an ethylenically unsaturated carbamate of a styrene allyl alcohol copolymer, drying the coating composition to remove solvent and curing the dried coating by exposing it to ultraviolet radiation or an electron beam. The dried coating may optionally be sanded, buffed or repaired prior to radiation curing to provide a glossy, tough, durable, defect-free finish.

The styrene allyl alcohol copolymers useful in the present invention are those containing from about 50 to 94 percent by weight of styrene or a substituted styrene monomer, and preferably 60 to 85 percent by weight and correspondingly, from about 50 to 6 percent by weight of the ethylenically unsaturated alcohol, and preferably from about 40 to 15 percent on the same basis. In general, the styrene allyl alcohol copolymers have from about 1.8 to 10 percent hydroxy groups by weight, preferably 4 to 9 percent. The styrene allyl alcohol copolymers are of number average molecular weight in the range of about 400 to about 5000 daltons, and more preferably in the range of about 800 to about 2000 daltons and contain sufficient ethylenically unsaturated alcohol to provide on average at least about two hydroxy groups per molecule and preferably from 2 to 10 hydroxy groups per molecule. The actual hydroxy group content of the aforesaid copolymers may not always conform to the theoretical content calculated from the relative proportions of styrene monomer and ethylenically unsaturated alcohol, due to possible destruction of hydroxy groups during copolymerization.

The styrene monomer moiety of the copolymer may be styrene or a ring-substituted styrene in which the substituents are 1–4 carbon atom alkyl groups or chlorine atoms or mixtures thereof. Examples of such ring-substituted styrenes include the ortho-, meta-, and para-, methyl, ethyl, butyl, etc., monoalkyl styrenes, 2,3-, 2,4-dimethyl and diethyl styrenes; mono-, di- and tri-chlorostyrenes, etc. Mixtures of two or more of such styrene monomer moieties may be present. The ethylenically unsaturated alcohol moiety may be allyl alcohol, methallyl alcohol, or a mixture thereof. For the purposes of brevity and simplicity of discussion, the entire class of copolymers set forth in this paragraph shall hereinafter be referred to simply as styrene allyl alcohol copolymers.

The styrene allyl alcohol copolymers may be prepared in several ways. One operable method which yields styrene allyl alcohol copolymer starting materials which are solid products is taught in U.S. Pat. No. 2,894,938.

Useful isocyanates for addition to the styrene allyl alcohol copolymers include vinyl isocyanates, isocyanatoalkyl acrylates and methacrylates and a variety of aralkyl monoisocyanates. Specific isocyanates include vinyl isocyanate, isopropenyl isocyanate, 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinylbenzene, 1-(1-isocyanatoethyl)-4-vinylbenzene, 1-(1-isocyanato-1-methylethyl)-3-(1-methylethenyl)benzene and 1-(1-isocyanato-1-methylethyl)-4-(1-methylethenyl) benzene.

The preferred isocyanates are 2-isocyanatoethyl acrylate, 2-isocyanatoethyl methacrylate, 1-(1-isocyanato-1-methylethyl)-3-(1-methylethenyl) benzene and 1-(1-isocyanato-1-methylethyl-4-(1-methylethenyl)benzene.

The reaction of the unsaturated isocyanate with the styrene allyl alcohol copolymer is conveniently carried out in a melt of the copolymer or in an anhydrous solution in a solvent such as an ester, a ketone, or an aromatic hydrocarbon to provide a resin concentration in the range of about 30 to 90 weight percent preferably about 50 to 80 weight percent, and in the presence of a catalytic amount of a suitable catalyst such as a tertiary amine for example triethylenediamine or a tin compound for example stannous octoate, dibutyltin diacetate, dibutyltin dioctoate, dibutyltin dilaurate. Advantageously, the reaction is carried out at a temperature in the range of about 20° to 170° C. The temperature selected will depend on the reactivity of the isocyanate reactant. For example when 2-isocyanatoethyl methacrylate is the isocyanate used for reaction with the styrene allyl alcohol copolymer, the temperature is preferably in the range of 20° to 50° C. while for 1(1-isocyanato-1-methylethyl)-3-(1-methylethenyl)benzene, the temperature is preferably in the range of 100° to 150° C. The solution of the reaction product can be used to provide the coating composition of the present invention. Alternatively the solvent can be stripped to provide the undiluted resin which may then be dissolved in a solvent such as an alcohol, whose presence is prohibited at the isocyanate reaction stage.

While stoichiometric quantities of isocyanate and styrene allyl alcohol copolymer can be used in the reaction, it is generally advantageous to use no more than about 98 percent of the stoichiometric quantity of isocyanate to ensure that essentially no unreacted isocyanate remains in the ethylenically unsaturated carbamate product. Advantageously sufficient isocyanate is used to react with from 20 to 96 percent of the alcohol groups and preferably sufficient to react with 50 to 95 percent of the alcohol groups to provide styrene allyl carbamate copolymers containing from about 1 to about 10 ethylenically unsaturated groups per molecule and preferably from about 2 to about 8 ethylenically unsaturated groups per molecule. With the addition of the isocyanate the molecular weight of the styrene allyl alcohol copolymer is increased from a range of about 400 to 4000 to a range of about 500 to 6000. Properties of the ethylenically unsaturated carbamates can be modified by reacting a portion of the hydroxyl groups of the copolymer with other reagents to increase such properties as hardness, flexibility and solvent resistance.

The coating composition of the present invention is advantageously applied as a solution to a suitable substrate such as wood, plastic, metal, ceramic, and the like by spraying, dipping, brushing, curtain coating or by another such method. Advantageously the coating composition can be applied at high solids thus reducing the amount of volatile organic compounds released during drying After coating, the solvent is allowed to evaporate, aided by heat or forced air when necessary, until the coating is dry. At this stage the coating can be repaired for example by removal with solvent and recoating, or by sanding, buffing and polishing. The coating composition of the present invention is characterized as non-air-drying, i.e. it is incapable of cure by absorption of oxygen into the composition in the manner that air-drying alkyds are conventionally cured. This intermediate stage is then cured to achieve solvent and abrasion resistance by exposure to radiation.

When irradiation is ultraviolet, a photopolymerization initiator facilitates the curing step. Such initiators include acyloin and derivatives thereof, such as benzoin, benzoin methyl ether, benzoin ethyl ether, benzoin isopropyl ether, benzoin isobutyl ether, and 2-hydroxy-2-methyl-1,2-diphenylethanone; diketones such as benzil and diacetyl, etc; phenones such as acetophenone, 2,2,2-tribromo-1-phenylethanone, 2,2-diethoxyacetophenone, 2,2-di-methoxy-2-phenylacetophenone, methyl benzoyl formate, 2,2,2-tribromo-1-(2-nitrophenyl)ethanone, benzophenone, and 4,4'-bis(dimethylamino)benzophenone, and 1-hydroxycyclohexylphenyl ketone. Normally, the initiator is used in amounts ranging from about 0.01 to 10% by weight of the total polymerization composition. When the quantity is less than 0.01% by weight, the polymerization rate becomes extremely low. If the initiator is used in excess of about 10% by weight, no correspondingly improved affect can be expected. Thus, addition of such greater quantity is not economically justified. Preferably, about 0.25 to 5% of initiator is used in the polymerizable composition.

The photopolymerization of the composition of the invention occurs on exposure of the composition to any source of radiation emitting actinic radiation at a wavelength within the ultraviolet and visible spectral regions. Suitable sources of radiation include mercury, xenon, carbon arc and tungsten filament lamps. Exposures may be from less than about one second to ten minutes or more depending upon the amounts of particular polymerizable materials, the photopolymerization catalyst being utilized, the radiation source, the distance of the composition from the source and the thickness of the coating to be cured. The compositions may also be polymerized by exposure to electron beam irradiation. Generally speaking, the dosage necessary is from less than 1 megarad to 30 megarads or more. An advantage of curing with electron beam irradiation is that highly pigmented compositions can be effectively cured at a faster rate than by mere exposure to actinic radiation.

The radiation curable compositions of this invention and optional polymerization initiator can, but do not have to be, formulated with polymerizable $\alpha,\beta$-ethylenically unsaturated modifying monomers to enhance the cure rate and the properties of the coatings, e.g., hardness, flexibility, and adhesion. Such monomers may also be used as reactive diluents Suitable ethylenically, unsaturated monomers which can be used are essentially non-volatile ethylenically unsaturated esters and amides. The term "essentially non-volatile" connotes a substance of vapor pressure less than about 130 Pa at 20° C. Monomers which can be included in the coating composition, are advantageously of number average molecular weight less than about 4000 daltons, and unsaturation equivalent weight of less than about 1000 daltons and contain at least about 2 ethylenically unsaturated groups per molecule. Such monomers include maleic and fumaric polyesters formed by reaction of maleic anhydride or acid or fumaric acid with polyol and (meth)-acrylic esters and amides. Typical (meth)-acrylic esters and amides are represented by the formula

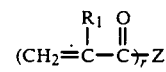

$$(CH_2=C-C)_{\overline{r}}Z$$
with $R_1$ above C and O above the second C where $R_1$ is selected from the group consisting of H and $CH_3$ where r is an integer in the range of 1 to 10, preferably in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone. Such monomers may be obtained by reaction of acryloyl or methacroloyl chloride with an alcohol, a polyol, an amine, or a polyamine or by the reaction of acrylic acid, methacrylic acid, acrylamide or methacrylamide with an epoxide, a polyepoxide, an isocyanate, or a polyisocyanate, or by reaction of a hydroxyalkyl acrylate or methacrylate with a carboxyllic acid, polycarboxylic acid, an epoxide, a polyepoxide, an isocyanate, a polyisocyanate, a methylol amino resin, a polymethylol amino resin, a methoxymethyl amino resin or a polymethoxymethyl amino resin. Such (meth)-acryloyl compositions include isobornyl acrylate, 1,3-butylene glycol diacrylate, 1,6-hexanediol diacrylate, the polyacrylates and polymethacrylates of polyethyleneoxy diols and polyols, polypropyleneoxy diols and polyols and poly(-tetramethyleneoxy) diols and polyols of molecular weight in the range of 100 to 4000 daltons, pentaerythritol tetraacrylate, trimethylolpropane triacrylate, dipentaerythritol monohydroxypentaacrylate, ethoxylated bisphenol A dimethacrylate, the diacrylates and dimethacrylates of epoxy compounds formed from bisphenol A and epichlorohydrin of molecular weight in the range of 200 to 4000 daltons, the polyacryloyl monomers prepared by reacting isocyanate capped polyethers and isocyanate capped polyesters of molecular weight up to 4000 daltons with hydroxyethyl (meth)-acrylate, and the polyacryloyl monomers prepared by reacting (meth)acrylic acid, (meth)-acrylamide or hydroxyethyl (meth)-acrylate with polymethoxyalkyl amino resins such as hexamethoxymethyl melamine.

In general the amount of reactive diluent used with the ethylenically unsaturated carbamate of the styrene allyl alcohol copolymer is selected to enhance the cure rate and the properties of the coatings both in the uncured and the cured state. Advantageously as much as fifty percent or more of the total weight of unsaturated carbamate and reactive diluent can be provided by the reactive diluent. However, preferably at least sixty percent is provided by the unsaturated carbamate. The compositions of the invention can also include (besides the monomers, oligomers, and resins mentioned above), a variety of additives utilized for their known purposes, such as stabilizers, inhibitors, lubricants, flexibilizers, pigments, dyes, and fillers such as finely divided silica, diatomaceous earth, metal oxides, fiberglass, glass bubbles, and talc. Fillers can generally be used in portions up to about 200 percent by weight of the curable composition but preferably are used up to about 50 percent by weight. It is desirable that the above optional additives be transparent to the radiation.

The coating compositions of the present invention comprising the ethylenically unsaturated carbamate of a styrene allyl alcohol copolymer and when required a photopolymerization initiator and other optional ingredients, are generally prepared by simple mixing in the desired proportions. If a solvent is used in the coating composition, it is selected from any of the solvents which dissolve all of the organic components of the composition, such as ketones, esters, alcohols, ethers or aromatic hydrocarbons. The solvent used can be conveniently the solvent in which the ethylenically unsaturated carbamate is prepared. An advantage of the coating compositions of the present invention resides in their low viscosity at high solids concentrations. Compositions containing 90 weight percent solids can be readily prepared. For spray applications, solutions of 50 weight percent solids offer the advantages of generation of limited quantities of volatile organic compounds upon drying without the disadvantage of formation of thick coatings which can obscure the natural beauty of wood surfaces and give an undesirable plastic appearance to the coating.

The following examples are set forth to illustrate the invention but are not meant to limit it. Parts and percentages are by weight unless otherwise indicated.

Preparation of Ethylenically Unsaturated Carbamates of Styrene Allyl Alcohol Copolymers

EXAMPLE 1

1000 parts by weight of a styrene allyl alcohol copolymer of number average molecular weight 1150 and hydroxy equivalent weight of 220 (sold by Monsanto Company under the registered trademark RJ101) is dissolved in 1802 parts by weight of refluxing methyl isobutyl ketone while 690 parts by weight of the ketone is distilled. The solution is cooled to 70° C. and a nitrogen blanket is maintained over it. Dibutyltin diacetate (4.91 parts by weight) in 40 parts by weight of toluene is added and stirred in. 877 parts by weight of 1(1-isocyanato-1-methylethyl)-3-(1-methylethenyl)benzene, hereinafter referred to as IMB, (0.96 equivalent to 1 equivalent of SAA copolymer) is added at a steady rate over a period of 2 hours to the stirred solution of styrene allyl alcohol copolymer. Heating is continued at 70° C. after the addition is complete until the solution is shown by infrared analysis to be isocyanate free. The solution contains 62 percent solids and is of viscosity 420 cps. The unsaturation equivalent weight of the unsaturated carbamate is 433.

EXAMPLE 2

Example 1 is repeated with an equivalent ratio of 0.5 IMB to 1.0 SAA copolymer. A 56.5 percent solids solution in methyl isobutyl ketone of 140 cps viscosity is obtained. The unsaturation equivalent weight of the unsaturated carbamate is 663.

EXAMPLE 3

Example 1 is repeated at the same equivalent ratio of 0.95 IMB to 1.0 SAA copolymer using a styrene allyl alcohol copolymer of number average molecular weight 1600 and hydroxy equivalent of 302. A 56.6 percent solids solution of 150 cps viscosity is obtained. The unsaturation equivalent weight of the unsaturated carbamate is 517.

EXAMPLE 4

Example 1 is repeated with an equivalent ratio of 0.73 IMB to 1.0 SAA copolymer. A 59.2 percent solids solution in methyl iso-butyl ketone of 224 cps viscosity is obtained. The unsaturation equivalent weight of the unsaturated carbamate is 517.

EXAMPLE 5

Example 1 is repeated with an equivalent ratio of 0.25 IMB to 1.0 SAA copolymer. A 60.2 percent solids solution of 320 cps viscosity is obtained. The unsaturation equivalent weight of the unsaturated carbamate is 1125.

EXAMPLE 6

Example 3 is repeated with an equivalent ratio of 0.50 IMB to 1.0 SAA copolymer. A percent solids solution of 300 cps viscosity is obtained. The unsaturation equivalent weight of the unsaturated carbamate is 832.

EXAMPLE 7

Example 3 is repeated with an equivalent ratio of 0.25 IMB to 1.0 SAA copolymer. A 57 percent solids solution of 260 cps viscosity is obtained. The unsaturation equivalent weight of the unsaturation carbamate is 1462.

EXAMPLE 8

48 parts by weight of the styrene copolymer of Example 1 is reacted at room temperature with 32.9 parts by weight of 2-isocyanatoethyl methacrylate (IEM) using dibutyltin diacetate (0.5 parts) as catalyst to provide a 31 weight percent solution of unsaturated carbamate in methyl isobutyl ketone. The viscosity of the solution is 100 cps. The unsaturation equivalent weight of the unsaturated carbamate is 372.

EXAMPLE 9

Example 1 is repeated. The resulting resin solution is vacuum stripped at 150° C. to give a brittle, glassy solid with no remaining volatiles.

EXAMPLE 10

Example 1 is repeated using butyl acetate instead of MIBK as the solvent. The resulting resin solution has a solids level of 58% with a viscosity of 270 cps and an unsaturation equivalent weight of 437.

EXAMPLE 11

Example 1 is repeated using toluene instead of MIBK as the solvent. The resulting resin solution has a solids level of 59% with a viscosity of 330 cps and an unsaturation equivalent weight of 441.

EXAMPLE 12

1000 parts by weight of RJ-101 is dissolved in 1750 parts of butyl acetate under nitrogen. It is heated to reflux (~135° C.) for 30 minutes. 490 parts of distillate is then removed. 5.0 parts by weight of dibutyltin dilurate is added. 850 parts of IMB is added over 15 minutes. Reflux is continued for 2 hours more or until the solution is free of residual isocyanate. The resulting resin solution has a solids level of 60% with a viscosity of 350 cps and an unsaturation equivalent weight of 438.

Evaluation of Coating Compositions

Coating compositions are prepared with the unsaturated carbamate solutions of the examples according to the formulations set forth in Table 1. All formulations are prepared at 60 percent solids in methyl isobutyl ketone with 2% 1-hydroxycyclohexyl phenyl ketone (Irgacure 184 from Ciba-Geigy) and 2% methyl benzoyl formate (Vicure 55 from Akzo). Bonderite steel panels are coated using a 126 micron drowndown blade. After air-drying, the panels are placed in an oven at 60° C. for 45 minutes. They are exposed by passing through a Fusion Systems UV processor using a Fusion "H" bulb 8 times at 20 feet per minute to give a total exposure of 13,000 MJ/cm$^2$.

TABLE 1

Evaluation of Coatings Containing Unsaturated Carbamates of Styrene Allyl Alcohol Copolymer

| RESIN EXAMPLE | WT % | FIRST COREACTANT | WT % | SECOND COREACTANT | WT % | TACK FREE | GLOSS (20°) | TUKON | MEK RUBS |
|---|---|---|---|---|---|---|---|---|---|
| 1 | 60 | A | 40 | — | — | AD | 95% | 15 | 300 |
| 1 | 60 | A | 20 | B | 20 | AD | 93% | — | 300 |
| 1 | 74 | B | 13 | C | 13 | AD | 97% | 15 | 300 |
| 1 | 74 | B | 13 | D | 13 | AD | 95% | 12 | 300 |
| 1 | 60 | B | 30 | D | 10 | OD | 88% | 13 | 150 |
| 1 | 60 | B | 25 | D | 15 | UV | 93% | 9 | 300 |
| 1 | 74 | B | 13 | E | 13 | AD | 93% | 13 | 300 |
| 1 | 60 | B | 22.5 | D | 17.5 | OD | 89% | 10 | 200 |
| 2 | 60 | A | 40 | — | — | AD | 97% | 9 | 300 |
| 2 | 60 | A | 20 | B | 20 | AD | 87% | 11 | 300 |
| 3 | 60 | A | 40 | — | — | AD | 98% | 13 | 300 |
| 3 | 60 | B | 20 | C | 20 | UV | 81% | 10 | 300 |
| 3 | 60 | C | 40 | — | — | UV | 92% | 12 | 300 |
| 3 | 74 | B | 13 | C | 13 | OD | 98% | 8 | 100 |
| 4 | 60 | A | 20 | B | 20 | AD | 91% | 12 | 300 |
| 4 | 60 | A | 40 | — | — | AD | 98% | 10 | 300 |
| 4 | 60 | B | 20 | C | 20 | UV | 63% | 13 | 300 |
| 4 | 60 | C | 40 | — | — | UV | 91% | 14 | 300 |
| 4 | 80 | C | 20 | — | — | UV | 80% | 13 | 100 |
| 5 | 60 | A | 40 | — | — | OD | 90% | 8 | 300 |

COREACTANTS

A—Acrylated epoxy resin RDX-80945 from Celanese Corporation
B—Unsaturated polyester Chempol 029-A831-10 from Freeman Chemical
C—Tripropyleneglycol diacrylate
D—Neopentylglycol propoxylate diacrylate, Photomer 4127 from Henkel Corporation
E—Trimethylolpropane propoxylate triacrylate, Photomer 4072 from Henkel Corporation

TACK FREE KEY

AD—Tack-free after air-drying; sandable
OD—Tack-free after oven drying; sandable
UV—Tack-free after UV curing Similar compositions to those of Table 1 are prepared for electron beam curing except that no photo initiator is added. The coating compositions are applied to the test panels using a 126 micron drawn down blade. Under the same conditions as in Table 1, they reach a tack-free/sandable state. The solution of Examples 1-5 without co-reactant are similarly coated on panels and reach the tack-free/sandable state air-drying. Exposure of the coatings to an electron beam, provides cured coatings with high gloss and methyl ethyl ketone solvent resistance.

What is claimed is:

1. A substrate coated with a non-air-drying, radiation-curable, sandable coating composition comprising an ethylenically unsaturated carbamate derived from a styrene allyl alcohol copolymer and an ethylenically unsaturated isocyanate selected from the group consisting of isocyanatoalkyl acrylates, isocyanatoalkyl methacrylates, and aralkyl isocyanates.

2. The coated substrate of claim 1 wherein the styrene allyl alcohol copolymer is a copolymer of styrene or a substituted styrene and allyl alcohol or methallyl alcohol, has a hydroxy content of from about 1.8 to about 10 percent by weight and a styrene or substituted styrene content of from about 50 to about 94 percent by weight, and is of number average molecular weight in the range of about 400 to about 5000 daltons.

3. The coated substrate of claim 2 wherein the hydroxy content is in the range of about 4 to about 9 weight percent and the number average molecular weight is in the range of about 800 to about 2000 daltons.

4. The coated substrate of claim 1 wherein the isocyanate is selected from the group consisting of 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinyl-benzene, 1-(1-isocyanatoethyl)-4-vinylbenzene, 1-(1-isocyanato-1-methylethyl)-3-(1-methylethenyl)-benzene and 1-(1-isocyanato-1-methylethyl)-4-(1-methylethenyl)benzene.

5. The coated substrate of claim 1 wherein the isocyanate is isocyanatoethyl acrylate or isocyanatoethyl methacrylate.

6. The coated substrate of claim 1 wherein the isocyanate is 1-(1-isocyanato-1-methyl-ethyl)-3-(1-methylethenyl)benzene.

7. The coated substrate of claim 2 wherein the ethylenically unsaturated carbamate is of number average molecular weight in the range of about 500 to about 6000 daltons, containing from about 1 to about 10 ethylenically unsaturated groups per molecule.

8. The coated substrate of claim 7 wherein the ethylenically unsaturated carbamate contains from about 2 to about 8 ethylenically unsaturated groups per molecule.

9. The coated substrate of claim 1 further comprising an essentially non-volatile α,β-ethylenically-unsaturated co-reactant.

10. The coated substrate of claim 9 wherein the α,β-ethylenically unsaturated co-reactant has an unsaturation equivalent weight of less than 1000 daltons and is a maleic or fumaric ester or a (meth)-acrylic ester or amide containing at least about 2 α,β-ethylenically unsaturated groups per molecule.

11. The coated substrate of claim 9 wherein the (meth)-acrylic ester or amide is represented by the formula

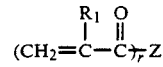

where $R_1$ is selected from the group consisting of H and $CH_3$ where r is an integer in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone.

12. A substrate coated with the radiation-cured coating composition of claim 1.

13. A substrate coated with the radiation-cured coating composition of claim 2.

14. A substrate coated with the radiation-cured coating composition of claim 3.

15. A substrate coated with the radiation-cured coating composition of claim 4.

16. A substrate coated with the radiation-cured coating composition of claim 5.

17. A substrate coated with the radiation-cured coating composition of claim 6.

18. A substrate coated with the radiation-cured coating composition of claim 7.

19. A substrate coated with the radiation-cured coating composition of claim 8.

20. A substrate coated with the radiation-cured coating composition of claim 9.

21. A substrate coated with the radiation-cured coating composition of claim 10.

22. A substrate coated with the radiation-cured coating composition of claim 11.

* * * * *